(12) United States Patent
Zhou et al.

(10) Patent No.: US 10,040,003 B2
(45) Date of Patent: Aug. 7, 2018

(54) COMBINED DEGASSING METHOD FOR SPINNING SOLUTIONS

(71) Applicant: HISMER BIO-TECHNOLOGY CO., LTD., Ninyang, Taian, Shandong (CN)

(72) Inventors: Jiacun Zhou, Shandong (CN); Guangmin Hu, Shandong (CN)

(73) Assignee: HISMER BIO-TECHNOLOGY CO., LTD., Shandong (CN)

( * ) Notice: Subject to any disclaimer, the term of this patent is extended or adjusted under 35 U.S.C. 154(b) by 175 days.

(21) Appl. No.: 14/916,024

(22) PCT Filed: Sep. 1, 2014

(86) PCT No.: PCT/CN2014/085696
§ 371 (c)(1),
(2) Date: Mar. 2, 2016

(87) PCT Pub. No.: WO2015/027957
PCT Pub. Date: Mar. 5, 2015

(65) Prior Publication Data
US 2016/0214035 A1    Jul. 28, 2016

(30) Foreign Application Priority Data

Sep. 2, 2013 (CN) .......................... 2013 1 0391868

(51) Int. Cl.
*B01D 19/00* (2006.01)
*B01D 19/02* (2006.01)
(Continued)

(52) U.S. Cl.
CPC ............. *B01D 19/02* (2013.01); *D01D 1/103* (2013.01); *D01F 9/00* (2013.01)

(58) Field of Classification Search
CPC ..... B01D 19/00–19/0495; D01D 1/103; D01F 9/00
See application file for complete search history.

(56) References Cited

U.S. PATENT DOCUMENTS 4,391,529 A * 7/1983 Hedrich .............. B01F 7/00208
366/181.4

FOREIGN PATENT DOCUMENTS

| CN | 201415833 | 5/2010 |
| CN | 101797449 | 8/2010 |

(Continued)

*Primary Examiner* — T. Bennett McKenzie
(74) *Attorney, Agent, or Firm* — Muncy, Geissler, Olds & Lowe, P.C.

(57) ABSTRACT

A combined degassing method for a high-viscosity pure-chitosan spinning solution, including: step 1, thoroughly dissolving the spinning solution in a dissolution vessel for subsequent use, the viscosity reaching 450,000-500,000 mpa·s; step 2, delivering the spinning solution in step 1 to the feed port of a degassing vessel from the dissolution vessel after filtration; step 3, in the degassing vessel, under the conditions of vacuumizing and maintaining the inner pressure of the degassing vessel to be 500-3,000 Pa, performing continuous treatment by a combined degassing process integrating separation, film-scraping, lifting and shear; and step 4, sampling at a sampling port for the detection of degassing degree, finishing the degassing operation if the detection result is eligible, otherwise repeating step (3) until the detection result is eligible. This method has high degassing efficiency and good degassing effect, and is applicable to spinning solutions of a wide range of viscosity.

3 Claims, 2 Drawing Sheets

(51) Int. Cl.
*D01D 1/10* (2006.01)
*D01F 9/00* (2006.01)

(56) References Cited

FOREIGN PATENT DOCUMENTS

| CN | 203494229 | 3/2014 |
| JP | 2003103110 | 4/2003 |
| JP | 2006061780 | 3/2006 |

* cited by examiner

COMBINED DEGASSING METHOD FOR SPINNING SOLUTIONS

TECHNICAL FIELD

The present invention relates to a degassing method for spinning solutions, in particular to a degassing method for chitosan spinning solutions.

BACKGROUND ART

Chitosan fibers refer to the fibers made of extracts from shells of shrimps and crabs, and have many advantages as compared with the conventional land natural fibers and synthetic fibers. On the one hand, pure chitosan fibers neither depend on petroleum nor compete against crops for the land, and serve as the third source of chemical fibers. On the other hand, the waste reutilization conforms to the trend of environmentally sustainable development. Furthermore, pure chitosan fibers have broad-spectrum antimicrobial activity, mildew resistance, excellent biocompatibility and no immunogenicity, and also have the effects of adsorption chelation, hemostasis, wound-healing and scar formation inhibition. Owing to these functions, pure chitosan fibers can be widely applied in the fields of aerospace, medical and health care, military and civil textiles and filter protection, have a good market prospect, and play a positive role in promoting human health.

Deacetylation and viscosity are two important quality indicators of chitosan. It is well known that the greater the molecular weight of chitosan, the higher the viscosity. The relation (Mark-Houwink) between viscosity and molecular weight is represented by the formula: $[\eta]=kM^\alpha$ ($\eta$: viscosity, mpa·s, K: constant, M: relative molecular mass, a: a numerical value related to molecular weight). It thus can be seen that the higher the viscosity of pure chitosan spinning solution, the greater the molecular weight, so that the pure chitosan fibers spun therefrom are better in dry-breaking strength, breaking elongation and spinnability. Accordingly, only high-viscosity pure chitosan spinning solution can meet the requirements for spinning of high-quality pure chitosan fibers, and the desired viscosity of spinning solution for spinning of high-quality pure chitosan fibers is greater than 450,000 mpa·s.

Upon decalcification and deproteinization, a great deal of cavities are generated in the structure of flake chitosan, and these cavities are filled with air, flake chitosan itself is formed by lamination of two or more layers, with a great deal of air in the gaps. During the dissolution of chitosan, the air in the cavities and gaps are entrained in the chitosan solution and can not escape. In addition, a large amount of air bubbles are generated during stir-dissolution, filtration and transport of the chitosan spinning solution, and these air bubbles enter the degassing vessel along with the spinning solution.

In the wet-spinning process, the spinning solution should be degassed before being sprayed into the solidification bath from the spinning plate, if there are air bubbles in the spinning solution in the solidification bath, the air bubbles escape to cause filament breakage, and the viscosity of the pure chitosan spinning solution is greater than 450,000 mpa·s, which is almost 10 times the viscosity of the common spinning solution, as a result, the conventional degassing process has an extremely-low production efficiency and fails to realize industrial production.

Technical Problems

The present invention solves the technical problems in the prior art, and provides a degassing method with high degassing efficiency and good degassing effect, and is applicable to spinning solutions of a wide range of viscosity.

Solutions to the Problems

Technical Schemes

The present invention adopts the technical scheme as follows:

a combined degassing method for a spinning solution, comprising the following steps of:

step 1, dissolving the spinning solution in a dissolution vessel for subsequent use;

step 2, delivering the spinning solution in step 1 to the feed port of a degassing vessel from the dissolution vessel through a filter under the action of compressed air as power;

step 3, in the degassing vessel, under the conditions of vacuumizing and maintaining the inner pressure of the degassing vessel to be 500-3,000 Pa, performing continuous treatment on the spinning solution in step 2 by a combined degassing process integrating separation, film-scraping, lifting and shear, specifically comprising:

(a) forcing the spinning solution in step 2 which is delivered to the feed port of the degassing vessel under the power of compress air to pass through discharge holes distributed at the bottom of an annular feed pipe;

(b) enabling the spinning solution from step (a) to drop onto an umbrella-shaped diffusion plate in the degassing vessel, flow from the inner edge to the outer edge of the umbrella-shaped diffusion plate, and drop to the bottom of the degassing vessel when flowing to the outer edge of the umbrella-shaped diffusion plate;

(c) lifting the spinning solution at the bottom of the degassing vessel in step (b) up to the inner cavity of an inner cylinder body which is located above the umbrella-shaped diffusion plate via a stirring shaft with a screw propeller, enabling the solution to drop onto the umbrella-shaped diffusion plate through liquid outlet holes and then drop to the bottom of the degassing vessel from the umbrella-shaped diffusion plate;

repeating step (c);

steps (a), (b) and (c) being completed in the degassing vessel;

step 4, sampling the spinning solution in step (3) at a sampling port for the detection of degassing degree, finishing the degassing operation if the detection result is eligible, otherwise repeating step (3) until the detection result is eligible. It is characterized by that the spinning solution is chitosan spinning solution and its viscosity reaches 450,000-500,000 mp·s.

The degassing vessel comprises a degassing vessel body (1) and a stirring device (2). A feed port (3), a vacuum port (5), a vacuum relief port (15) and a vacuum meter (17) are disposed at the upper part of the degassing vessel body (1); a discharge port (14) is disposed at the bottom center, and a sampling port (18) is disposed on the bottom lateral side; an annular feed pipe (7) is fixedly disposed at the inner upper part of the degassing vessel body (1), and the annular feed pipe (7) communicates with the feed port (3); and discharge holes (8) of 0.5-5 mm diameter are distributed on the part below the horizontal central plane of the annular feed pipe (7).

An inner cylinder body (9) is fixedly disposed in the axial position inside the degassing vessel body (1), the upper end opening of the inner cylinder body (9) is closed by a round plate on which liquid outlet holes (11) of 0.5-5 mm diameter are distributed and the lower end opening is open; an umbrella-shaped diffusion plate (10) is fixedly disposed at the periphery of the upper half part of the inner cylinder body (9), the inner cylinder body (9) is divided by the umbrella-shaped diffusion plate (10) to upper and lower portions; a gap of 100-200 mm is formed between the outer edge of the umbrella-shaped diffusion plate (10) and the inner wall of the degassing vessel body (1); and liquid outlet holes (11) of 0.5-5 mm diameter are distributed on the body of the inner cylinder body (9) above the umbrella-shaped diffusion plate (10).

The lower edge of the umbrella-shaped diffusion plate (10) is located above the effective solution level, and the included angle of axial lines of the umbrella-shaped diffusion plate (10) and the inner cylinder body (9) is as follows: $\alpha=65°-80°$.

A stirring power device (13) comprises a motor, a speed reducer and a power support (25), the power support (25) is disposed in the center position of the outer top wall of the degassing vessel (1), and the speed reducer and the motor are disposed on the power support (25); the upper end of a stirring shaft (12) is disposed on the stirring power device (13) such that the stirring shaft (12) and the output shaft of the speed reducer are engaged; the stirring shaft (12), from top to bottom, passes through a seat-mounted bearing which is disposed inside the power support (25), passes through a mechanical seal device (16) used for sealing the assembly gap between the degassing vessel (1) and the stirring shaft (12), enters the dissolution vessel (1) with the lower end being fixed on the seat-mounted bearing (6); and by the fixation of the upper and lower ends, the stirring shaft (12) run more stably.

A gap of 3 mm-5 mm is formed between the inner wall of the inner cylinder body (9) and the screw propeller (14).

In step (2), the spinning solution is delivered to the feed port of the degassing vessel from the dissolution vessel upon the filtration of a two-stage filter, under compressed air of 0.8 MPa-1.2 MPa as power.

In step (3), the stirring shaft with the screw propeller lifts the spinning solution up to the umbrella-shaped diffusion plate from the bottom of the degassing vessel, with the rotational speed of 60-90 rpm.

Advantages of the Invention

Advantages

The present invention has the advantages as follows:

(a) since the annular feed pipe is disposed at the inner upper part of the vessel, the annular feed pipe communicates with the feed port and is provided at the bottom with the small discharge holes, the pressurized high-viscosity pure-chitosan spinning solution enters the annular feed pipe through the feed port and then is forced to flow out of the small discharge holes, and also the diameter of the small discharge holes is only 0.5-5 mm and the inner pressure of the degassing vessel is less than 3,000 Pa, the spinning solution falls freely under the gravity action and drops onto the umbrella-shaped diffusion plate, the air bubbles in the spinning solution are sheared when going through the small discharge holes, leading to the changes of the interfacial layer of the spinning solution, as a result, the air bubbles escape rapidly, thereby completing the first-stage degassing process by high-pressure separation shear.

(b) after the first-stage degassing process, the pure-chitosan spinning solution uniformly drops on the umbrella-shaped diffusion plate, under the action of gravity and the action of inclination of the umbrella-shaped diffusion plate, the spinning solution flows from the inner edge to the outer edge of the umbrella-shaped diffusion plate to form a spinning solution film which increases the degassing area, under such a condition that the inner pressure of the degassing vessel is less than 3,000 Pa, a part of air bubbles escape; when the spinning solution flows to the outer edge of the umbrella-shaped diffusion plate, the spinning solution falls freely under the gravity action and drops to the bottom of the degassing vessel, during down-flow, the outer edge of the umbrella-shaped diffusion plate takes the shear action on the spinning solution, leading to the changes of the interfacial layer of the spinning solution, as a result, the air bubbles escape rapidly, thereby completing the second-stage degassing process by film-scraping shear.

(c) Owing to the special structure that the degassing vessel of the present invention has the inner cylinder body and the stirring shaft with screw propeller, and the inner body wall of the upper part of the umbrella-shaped diffusion plate and the upper end closing cover are distributed with small liquid outlet holes, after the second-stage degassing process the pure-chitosan spinning solution is lifted up from the vessel bottom to the upper part of the inner cylinder body under the stirring action of the screw propeller, so that the pure-chitosan spinning solution only flows out of the small liquid outlet holes, achieving the effect of degassing process (a); when the spinning solution drops to the vessel bottom from the umbrella-shaped diffusion plate, the effect of degassing process (b) is achieved, as a result, the effects of both degassing process (a) and degassing process (b) are achieved in one step by the stirring-lifting device alone. Particularly, the problem in the prior art that the spinning solution at the bottom of the degassing vessel is not degassed can be solved. The device runs continuously and completes the high-efficiency high-quality degassing operation.

(d) In terms of actual degassing effect, in the degassing vessels of the same volume and sectional area, 6 tons of pure-chitosan spinning solution having 500,000 mpa·s viscosity can be fully degassed within 8 hours by the method of the present invention, while 6 tons of pure-chitosan spinning solution having 500,000 mpa-s viscosity can be fully degassed within 40-55 hours by the conventional degassing method, accordingly, the degassing efficiency of the present invention is increased by 5-7 times.

BRIEF DESCRIPTION OF THE DRAWINGS

Figure Description

PREFERRED EMBODIMENTS OF THE INVENTION

Preferred Examples of the Invention

Figure 1:
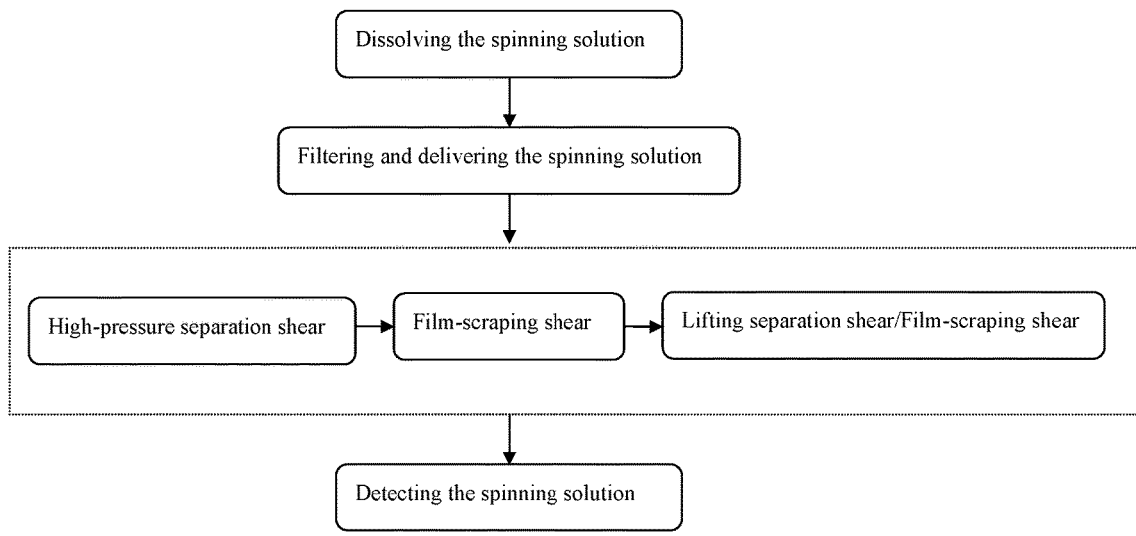
FIG. 1 is a flow diagram of the present invention.
Figure 2:
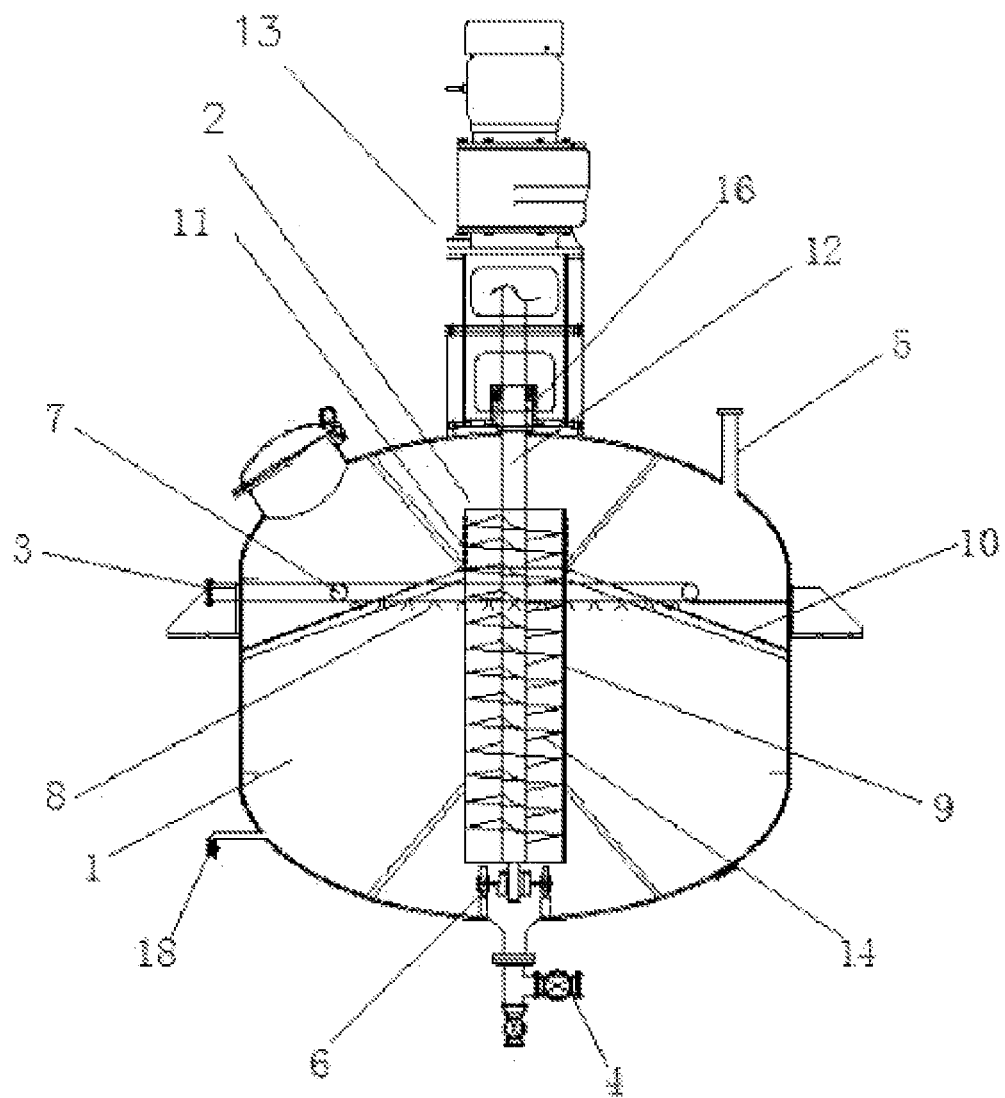
FIG. 2 is a structural diagraph of the present invention;
Description of the reference numbers in specification:
degassing vessel body - - - 1, stirring device - - - 2, feed port - - - 3, discharge port - - - 4, vacuum port - - - 5, seat-mounted bearing - - - 6, annular feed pipe - - - 7, discharge hole - - - 8, inner cylinder body - - - 9, umbrella-shaped dispersion plate - - - 10, liquid outlet hole - - - 11, stirring shaft - - - 12, stirring power unit - - - 13, screw propeller - - - 14, vacuum relief port - - - 15, mechanical sealing device - - - 16, vacuum meter - - - 17, sampling port - - - 18

The present invention is illustrated more clearly with reference to the accompanying drawings 1, 2, and the detailed description is as follows:

Example 1

6 Tons of ultra-pure-chitosan spinning solution having 500,000 mpa·s viscosity is thoroughly dissolved in the dissolution vessel, delivered to the feed port of the degassing vessel from the dissolution vessel under the action of 0.8 MPa compressed air as power after the filtration of the two-stage filter, moved to the annular feed pipe in the degassing vessel which is vacuumized and has the inner pressure maintained to be 500 Pa, and forced to flow out of the discharge holes, the spinning solution falls freely under the gravity action and drops to the umbrella-shaped dispersion plate, the air bubbles in the spinning solution are sheared when flowing out of the discharge holes, leading to the changes of the interfacial layer of the spinning solution, as a result, the air bubbles escape rapidly, thereby completing the first-stage degassing process by high-pressure separation shear.

After the first-stage degassing process, the pure-chitosan spinning solution uniformly drops onto the umbrella-shaped diffusion plate, under the action of gravity and the action of inclination of the umbrella-shaped diffusion plate, the spinning solution flows from the inner edge to the outer edge of the umbrella-shaped diffusion plate to form a spinning solution film which increases the degassing area, and under the condition that the inner pressure of the degassing vessel is 500 Pa, a part of air bubbles escape; when the spinning solution flows to the outer edge of the umbrella-shaped diffusion plate, the spinning solution falls freely under the gravity action and drops to the bottom of the degassing vessel, during down-flow, the outer edge of the umbrella-shaped diffusion plate takes the shear action on the spinning solution, leading to the changes of the interfacial layer of the spinning solution, as a result, the air bubbles escape rapidly, thereby completing the second-stage degassing process by film-scraping shear.

After the second-stage degassing process, the pure-chitosan spinning solution is stirred by the screw propeller, lifted up to the inner cavity of the inner cylinder body at the upper part of the umbrella-shaped diffusion plate, under the stirring action of the stirring shaft with the screw propeller at the constant rotational speed of 90 rpm, as the inner body wall of the upper part of the umbrella-shaped diffusion plate and the upper cylinder opening are distributed with the small liquid outlet holes, the spinning solution is forced to flow out of the small liquid outlet holes, thereby achieving the effect of degassing process (a); when the spinning solution drops to the vessel bottom from the umbrella-shaped diffusion plate, the effect of degassing process (b) is achieved, as a result, the effects of both degassing process (a) and degassing process (b) are achieved in one step by the stirring-lifting device alone. Particularly, the problem in the prior art that the spinning solution at the bottom of the degassing vessel is not degassed can be solved. The device runs continuously and completed the high-efficiency high-quality degassing operation.

After the stirring-lifting degassing process, the spinning solution is sampled at the sampling port for the detection of degassing degree, the degassing process is finished if the detection result is eligible, otherwise step (3) is repeated until the detection result is eligible.

Therefore, by the combined continuous degassing treatment integrating separation, film-scraping, lifting and shear, 6 tons of ultra-pure-chitosan spinning solution having 500,000 mpa·s viscosity which is thoroughly dissolved in the dissolution vessel can be fully degassed within 6-8 hours.

Example 2

The steps of Example 1 are re-performed, under the conditions that the 6 tons of ultra-pure-chitosan spinning solution having 450,000 mpa·s viscosity which is thoroughly dissolved in the dissolution vessel is used, compressed air of 1.2 MPa is used as power, the degassing vessel is vacuumized and the inner pressure of the degassing vessel is maintained to be 3,000 Pa, and the stirring shaft runs with the constant rotational speed of 60 rpm, thereby completing high-efficiency high-quality degassing operation of the present invention.

Example 3

The steps of Example 1 are re-performed, under the conditions that the 6 tons of ultra-pure-chitosan spinning solution having 480,000 mpa-s viscosity which is thoroughly dissolved in the dissolution vessel is used, compressed air of 1.0 MPa is used as power, the degassing vessel is vacuumized and the inner pressure of the degassing vessel is maintained to be 2,000 Pa, and the stirring shaft runs with the constant rotational speed of 70 rpm, thereby completing high-efficiency high-quality degassing operation of the present invention.

INDUSTRIAL APPLICABILITY

It is well known that the greater the viscosity of the pure-chitosan spinning solution, the better performances of the chitosan fibers therefrom, including dry-breaking strength, breaking elongation and spinnability. At room temperature, the pure chitosan spinning solution degrades along with time, and the viscosity is reduced, resulting the decrease in quality of pure chitosan fibers therefrom.

According to the present invention, the degassing efficiency of pure-chitosan spinning solution is increased, which can not only achieve continuous industrial production but also avoid the reduction in viscosity of the spinning solution, thereby ensuring the quality of pure-chitosan fibers.

The present invention is also applicable to the degassing operation of other high-viscosity spinning solutions.

The invention claimed is:

1. A combined degassing method for a chitosan spinning solution having a viscosity that reaches 450,000-500,000 mpa·s, comprising the following steps of:
   step 1, dissolving the spinning solution in a dissolution vessel for subsequent use,
   step 2, delivering the spinning solution in step 1 to the feed port of a degassing vessel from the dissolution vessel through a filter under the action of compressed air as power;
   step 3, in the degassing vessel, under the conditions of vacuumizing and maintaining the inner pressure of the degassing vessel to be 500-3,000 Pa, performing continuous treatment on the spinning solution in step 2 by a combined degassing process integrating separation, film-scraping, lifting and shear, specifically comprising:
   (a) forcing the spinning solution in step 2 which is delivered to the feed port of the degassing vessel under the power of compressed air, to pass through discharge holes distributed at the bottom of an annular feed pipe;

(b) enabling the spinning solution from step (a) to drop onto an umbrella-shaped diffusion plate in the degassing vessel, flow from the inner edge to the outer edge of the umbrella-shaped diffusion plate, and drop to the bottom of the degassing vessel when flowing to the outer edge of the umbrella-shaped diffusion plate;

(c) lifting the spinning solution at the bottom of the degassing vessel in step (b) up to the inner cavity of an inner cylinder body which is located above the umbrella-shaped diffusion plate via a stirring shaft with a screw propeller, enabling the solution to drop onto the umbrella-shaped diffusion plate through liquid outlet holes and then drop to the bottom of the degassing vessel from the umbrella-shaped diffusion plate;

repeating step (c); and step (a), (b), and (c) being completed in the degassing vessel; and step 4, sampling the spinning solution in step (3) at a sampling port for detection of degassing degree, finishing the degassing operation if the detection result is eligible, otherwise repeating step (3) until the detection result is eligible.

2. The combined degassing method for the spinning solution of claim 1, wherein, in step (2) the spinning solution is delivered to the feed port of the degassing vessel from the dissolution vessel after the filtration of the two-stage filter, under the action of compressed air as power.

3. The combined degassing method for the spinning solution of claim 1, wherein, in step (3) the stirring shaft with the screw propeller lifts the spinning solution up to the umbrella-shaped diffusion plate, with the rotational speed of 60-90 rpm.

* * * * *